United States Patent [19]

Clark et al.

[11] Patent Number: 5,028,661

[45] Date of Patent: * Jul. 2, 1991

[54] ADHESION PROMOTERS FOR THIOLENE ADHESIVE FORMULATIONS

[75] Inventors: Paul J. Clark, West Simsbury; Anthony F. Jacobine, Meriden; David M. Glaser, New Britain, all of Conn.

[73] Assignee: Loctite Corporation, Newington, Conn.

[ * ] Notice: The portion of the term of this patent subsequent to Apr. 10, 2007 has been disclaimed.

[21] Appl. No.: 443,046

[22] Filed: Nov. 27, 1989

Related U.S. Application Data

[63] Continuation of Ser. No. 156,314, Feb. 16, 1988, abandoned, which is a continuation-in-part of Ser. No. 149,894, Jan. 13, 1988, abandoned, and a continuation-in-part of Ser. No. 99,676, Sep. 21, 1987, Pat. No. 4,808,638, which is a continuation-in-part of Ser. No. 917,962, Oct. 14, 1986, abandoned.

[51] Int. Cl.$^5$ .................... C08L 81/00; C08F 283/00; C08G 77/04; C08G 63/68

[52] U.S. Cl. .................... 525/189; 525/479; 525/535; 528/26; 528/190; 528/192; 528/364

[58] Field of Search .................... 528/364, 376, 26, 190, 528/192, 360; 525/189, 479, 535

[56] References Cited

U.S. PATENT DOCUMENTS

| | | | |
|---|---|---|---|
| 3,619,393 | 11/1971 | Stahly et al. | 204/159.15 |
| 3,662,022 | 5/1972 | Lard | 522/100 |
| 3,754,972 | 8/1973 | Majistre et al. | 117/72 |
| 3,875,109 | 4/1975 | Bridgland | 524/429 |
| 3,987,127 | 10/1976 | Dickie et al. | 260/885 |
| 4,020,233 | 4/1977 | Morgan | 528/376 |
| 4,044,044 | 8/1977 | Saito et al. | 260/47 |
| 4,223,115 | 9/1980 | Zalucha et al. | 525/455 |
| 4,259,117 | 3/1981 | Yamauchi et al. | 106/35 |
| 4,272,586 | 6/1981 | Ando | 522/103 |
| 4,293,665 | 10/1981 | Zalucha et al. | 525/255 |
| 4,322,509 | 3/1982 | Zalucha et al. | 525/287 |
| 4,330,283 | 5/1982 | Michl et al. | 231/549 |
| 4,368,043 | 1/1983 | Yamauchi et al. | 433/217 |
| 4,433,124 | 2/1984 | Okamoto et al. | 526/277 |
| 4,434,278 | 2/1984 | Skiscim et al. | 525/531 |
| 4,446,246 | 5/1984 | McGinniss | 502/155 |
| 4,452,944 | 6/1984 | Dawdy | 525/126 |
| 4,463,169 | 7/1984 | Irving | 528/376 |
| 4,499,251 | 2/1985 | Omura et al. | 526/278 |
| 4,525,493 | 6/1985 | Omura | 523/116 |
| 4,540,738 | 9/1985 | Zimmermann | 526/193 |
| 4,543,397 | 9/1985 | Woods et al. | 525/455 |
| 4,640,849 | 2/1987 | Woods et al. | 427/54.1 |
| 4,707,397 | 11/1987 | Morimura | 428/216 |
| 4,731,146 | 3/1988 | Clark et al. | 156/314 |
| 4,766,005 | 8/1988 | Montgomery | 424/61 |
| 4,808,638 | 2/1989 | Steinkraus | 522/24 |
| 4,916,184 | 4/1990 | Clark | 528/364 |

FOREIGN PATENT DOCUMENTS

| | | |
|---|---|---|
| 0058483 | 1/1982 | European Pat. Off. . |
| 0074708 | 7/1982 | European Pat. Off. . |
| 156493 | 10/1985 | European Pat. Off. ............ 528/364 |
| 113843 | 10/1978 | Japan . |
| 100803 | 8/1981 | Japan . |

OTHER PUBLICATIONS

Chem. Abst. 101; 153164K (for J 59/84964).
Derwent Acc. No.: 82-00914J/47 (for J 57/167364).

*Primary Examiner*—Melvyn J. Marquis
*Assistant Examiner*—Steven Kumiega
*Attorney, Agent, or Firm*—Edward K. Welch, III; Eugene F. Miller

[57] ABSTRACT

Compounds useful as adhesion promoters for thermally cured thiolene adhesives include a) acrylic or norbornene acid phosphate esters such as

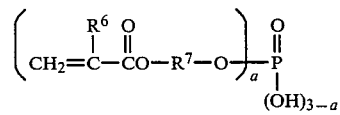

and

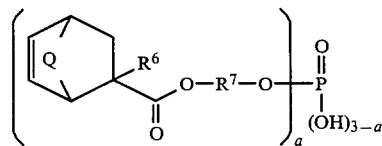

b) maleic, acrylic, methacrylic, norbornene dicarboxylic, and fumaric acids and half acid esters and peresters of maleic fumaric and norbornene dicarboxylic acids; and c) norbornene, acrylic or methacrylic silanes having two or three hydrolyzable groups bound to the silicon atom thereof, such as 5-(triacetoxysilyl) norbornene.

The adhesion promoters may be employed as surface primers for conventional thiolene compositions. Alternatively the thiolene compositions themselves may be modified by addition of 0.1 to 10% by weight of the adhesion promoter. Preferred thiolene compositions employ norbornene functional ene ingredients.

16 Claims, No Drawings

ADHESION PROMOTERS FOR THIOLENE ADHESIVE FORMULATIONS

This application is a continuation of co-pending Ser. No. 07/156,314 filed Feb. 16, 1988, now abandoned, which is a continuation-in-part of U.S. application Ser. No. 144,894, filed Jan. 13, 1988, now abandoned and a continuation-in-part of U.S. application Ser. No. 99,676 filed Sept. 21, 1987, now U.S. Pat. No. 4,808,638, which is a continuation-in-part of U.S. application Ser. No. 917,962, filed Oct. 14, 1986, now abandoned.

BACKGROUND OF THE INVENTION

In the field of adhesive bonding there is a substantial body of literature devoted to improving adhesion of various adhesive systems. The various techniques include altering substrate surfaces by cleaning, priming with intermediate adhesive materials, irradiating the surfaces, etc.; subjecting curable adhesives to specifically sequenced cure cycles; priming the substrate surfaces with various cure initiators or accelerators; and altering the adhesive composition by including specific compounds which improve the bond strength of the adhesive to the bonded substrates. Examples of the compounds in the latter category are silane compounds used in RTV silicone formulations which contain both polar groups compatible with metallic surfaces and hydrolyzable groups; and acrylic, maleic or fumaric compounds with various acid functionalities as well as silane compounds with acrylic and hydrolyzable groups, all of which have been used in acrylic adhesives of various types. Other examples are well known in the various curable adhesive arts.

The utility of co-curable adhesion promoters, however, tends to be very system specific. The particular adhesion promoter must not only provide functionalities which effectively provide a bridge from the adhesive to the substrate surface, it must also not significantly deteriorate the performance of the adhesive. Consequently, the selection of adhesion promoting additives in new curable systems cannot be made on the basis of performance in another curable system.

Thiolene curable systems involve addition of thiol (—SH) groups across an olefinic or acetylenic double bond. The reaction may be catalyzed by acids or free radicals. A detailed discussion of the mechanism of this reaction and of the academic literature in this field may be found in Oae, ed., "Organic Chemistry of Sulfur", Plenum Press New York, New York, pp. 131–187 (1977). Oswald et al reportedly disclosed photocrosslinkable compositions employing tetraallyl ester compounds and dithiols at the April 1965 ACS meeting in Detroit, Michigan. See Oswald et al, Die Makromolekulare Chemie, 97, 258–266 (1966). Formulations of di-or polythiols and dienes or polyenes which are curable to solids by chemical or photolytic radical generators are also described in U.S. Pat. Nos. 2,767,156; 3,661,744; 3,240,844; 4,119,617; and 4,157,421. All of these prior art curable formulations have involved polythiol additions to double bonds of linear olefins or acetylene compounds.

Silicone polymers having alkyl thiol groups are disclosed in U.S. Pat. No. 4,289,867 and background references discussed therein. In U.S. Pat. No. 4,284,539 other silicones having linear and cyclic mercaptoalkyl groups are described as are the thiol-ene reactions of such materials with silicones having vinyl or silacyclopentene groups. Peroxide cured compositions of vinyl terminated silicones with polythiols having organic or silicone are described in U.S. Pat. No.3,445,419.

In copending application Ser. No. 099,676, filed Sept. 21, 1987, now U.S. Pat. No. 4,808,638, and incorporated herein by reference, there are described improved thiolene curable systems based on compounds having a plurality of norbornenyl or analogous bicyclic ene groups.

Despite the extensive literature on thiolene compositions applicants have been unable to locate any reference which teaches adhesion promoting techniques for such compositions and in particular, have been unable to locate any references disclosing adhesion promoting co-curable additives for thiolene compositions.

In U.S. Pat. No. 4,435,497 there are described polymerizable thiolene resist compositions in which the ene compound contains at least one each of (meth)acryloxy groups; allyl, methallyl, or 1-propenyl groups bonded through an oxygen or oxycarbonyl group to an aromatic or cycloaliphatic nucleus; and carboxylic acid groups. The function of the carboxylic acid group is understood as a latent debonding agent, allowing removal of uncured formulation with a mild base wash and removal of the cured resist with a strong base wash.

SUMMARY OF THE INVENTION

The invention in one aspect comprises a thiolene composition which includes an additive which promotes adhesion to metals and other polar substrates the adhesion promoting compound selected from the group consisting of a) Acrylic or norbornene acid phosphate esters;

b) Maleic, acrylic, methacrylic, norbornene dicarboxylic and fumaric acids and half acid esters and peresters of maleic fumaric and norbornene dicarboxylic acids; and c) Norbornene, acrylic or methacrylic functional silanes having two or three hydrolyzable groups bound to the silicon atom thereof.

A further aspect of the invention comprises a composition as previously described wherein the ene compound contains a plurality of norbornene or similar bicyclic functional ene groups.

A still further aspect of the invention comprises an adhesively bonded article wherein the adhesive is a cured composition as described above.

In a further embodiment of the invention an adhesion promoting compound as described above is used as a surface primer to improve adhesion of cured thiolene compositions, especially of thermally cured thiolene adhesive compositions.

DETAILED DESCRIPTION OF THE INVENTION

The ene resins useful in the invention are compounds which may be represented by the formula:

where A is an n-valent organic or polyorganosiloxane residue, X is a terminal group which includes an aliphatically unsaturated carbon-carbon double or triple bond and n is an integer of at least 2. Suitable X groups include those represented by the formulas:

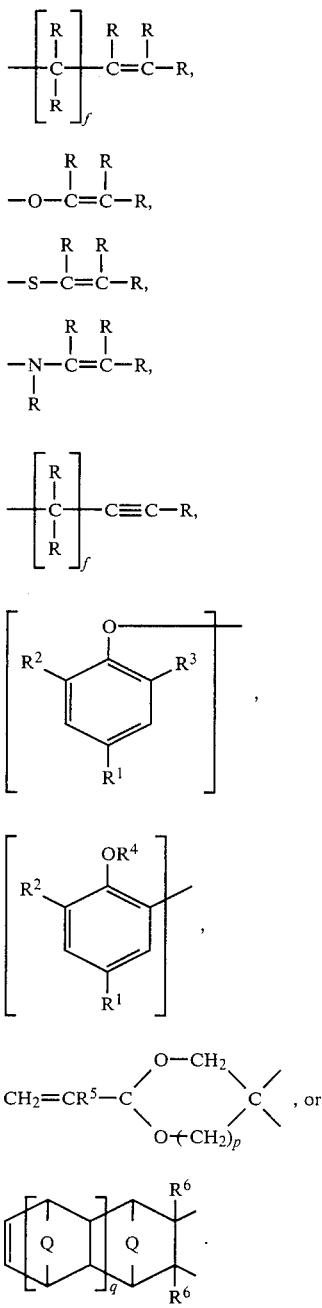

Thiolene compositions based on ene compounds having terminal groups (a) to (e) above are described in U.S. Pat. No. 3,661,744. In the groups (a) to (e), f is an integer from 1 to 9; R is a radical selected from the group consisting of hydrogen, fluorine, chlorine, furyl, thienyl, pyridyl, phenyl and substituted phenyl, benzyl and substituted benzyl, alkyl and substituted alkyl, alkoxy and substituted alkoxy, and cycloalkyl and substituted cycloalkyl. The substituents on the substituted members are selected from the group consisting of nitro, chloro, fluoro, acetoxy, acetamide, phenyl, benzyl, alkyl, alkoxy and cycloalkyl, the alkyl and alkoxy groups having from one to nine carbon atoms and cycloalkyl groups having from three to eight carbon atoms.

Ene compounds having terminal groups (f) and (g), above are described in U.S. Pat. Nos. 4,543,397 and 4,640,849, respectively. Thiolene compositions of such compounds are described in U.S. Ser. No. 001,498, filed Jan. 5, 1987, corresponding to EP 229033. In formulas (f) and (g) at least one of $R^1$, $R^2$, and $R^3$ is a member of the group consisting of vinyl, 1-propenyl and isopropenyl and the remaining $R^1$, $R^2$, and $R^3$ groups are selected from H, lower alkyl and alkoxy. $R^4$ is alkyl.

Thiolene compositions in which the ene compounds has terminal ene groups represented by formula (h) are described in U.S. Pat. Nos. 4,119,617 and 4,157,421. In formula (h), $R^5$ is H or alkyl and p is 0 or 1.

Preferred ene compounds and thiolene compositions based thereon are described in copending U.S. applications 099,676, filed Sept. 21, 1987, now U.S. Pat. No. 4,808,638, and PCT/US87/02618, filed Oct. 13, 1987. These preferred compositions have plural norbornene groups represented by formula (i) above, where $R^6$ is H or alkyl; Q is $CR^6_2$, O, S, $NR^6$ or $SO_2$ and q is an integer from 0 to 10. Most suitably q is 0 and Q is $CR^6$. Preferred enes of formula (i) include compounds with two or more nadimide groups such as

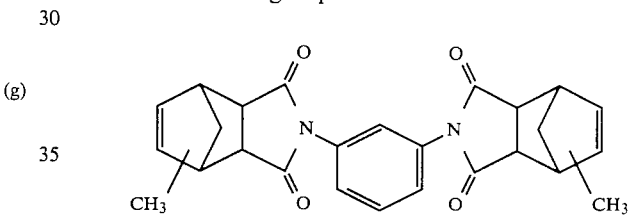

and ii) compounds derived from Diels-Alder reaction of cyclopentadiene with a plural acrylate or methacrylate compound. The latter compounds may be represented by the formula:

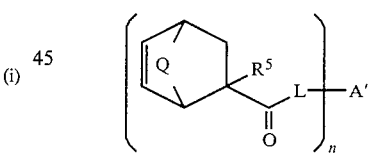

where A' is as defined above for A, L is O, S or $NR^5$ and n, $R^5$, and Q are as previously defined.

Particularly preferred are ene compounds represented by the formula:

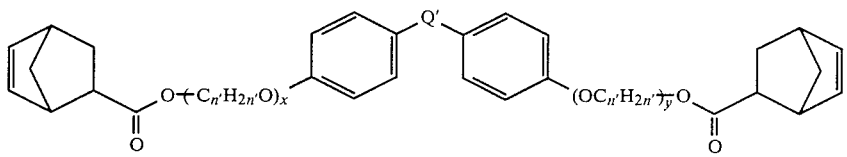

where Q' is as defined above for Q, n' is 1–6 and x and y are integers of one or more.

The polythiol component of the inventive compositions may be any compound having two or more thiol groups per molecule. Suitable polythiols are described in U.S. Pat. No. 3,661,744 at Col. 8, line 76–Col. 9, line 46, in U.S. Pat. No. 4,119,617, Col. 7, lines 40–57, U.S. Pat. No. 3,445,419 and U.S. Pat. No. 4,289,867. Especially preferred are polythiols obtained by esterification of a polyol with an α or β mercapto carboxylic acid such as thioglycolic acid, and β-mercaptopropionic acid. Particularly preferred polythiols are pentaerythritol-tetrakis-mercaptoacetate and pentaerythritol-tetrakis-βmercaptopropionate.

The ratio of the polyene to the polythiol component can be varied widely. Generally it is preferred that the ratio of thiol to ene groups be between 1:4 and 4:1 but ratios outside this range may occasionally be usefully employed if the numbers of ene or thiol groups per molecule of the excess component is particularly high.

The thiolene composition includes an effective amount of a free radical catalyst in addition to the thiol and ene ingredients. The free radical catalyst may be a photoinitiator, however, it will most usually be a thermal catalyst since the benefits of the invention are most desirable in applications for adhering two substrates together. Such applications rarely permit photoinitiated curing. The advantages of the invention are especially apparent with zinc surfaces, such as galvanized steel substrates. The thermal initiator may be a peroxide compound suitably a diacyl peroxide such as benzoyl peroxide, a hydroperoxide such as cumene hydroperoxide or a perester such as t-butyl perbenzoate. Other thermal radical initiators which may be employed include azonitrile compounds such as 2,2'-azobis(isobutyronitrile), and benzopinacol compounds, such as benzopinacol and the substituted benzopinacols disclosed in U.S. Pat. No. 4,330,283. Effective amounts of peroxy compounds are typically in the range of 0.1–5%. Effective amounts of azonitriles are typically in the range of 0.1–1% by weight of the compositions. Effective amounts of benzopinacols are typically in the range of 0.1–2% by weight.

The thiolene composition may also include stabilizers, fillers, reinforcing agents, thixotropic agents, and other conventional ingredients known in the thiolene and adhesive formulation arts. Useful stabilizers include conventional free radical stabilizers and certain vinyl compounds disclosed in U.S. Pat. No. 3,619,393.

The inventive compositions are characterized by the presence of an adhesion promoting compound as described above. The adhesion promoting compound may be present as a component of the base thiolene adhesive formulation or as a separate ingredient, applied to the substrate as a primer prior to application of the base adhesive, which diffuses into the surface contacting layers of the base adhesive prior to or during the curing reaction.

The adhesion promoting compound may be an acrylate or methacrylate acid phosphate ester, a corresponding norbornenyl compound. The acrylate and methacrylate acid phosphate esters are compounds which include at least one acrylate or methacrylate group and a group of the formula:

References which describe such acid phosphate (meth)acrylic esters and compositions thereof include U.S. Pat. Nos. 3,754,972; 3,987,127; 4,044,044; 4,250,007; 4,223,115; 4,293,665; 4,322,509; 4,452,944; 4,433,124; 4,434,278; 4,259,117; 4,368,043; 4,499,251; 4,525,493; and 4,515,930. Other such references include Jpn Kokai 57/167364 (1982); Jpn Kokai 49/20238 (1974); Jpn Kokai 49/84964 (1984), see Chem. Abst. 101: 153164k; Jpn Kokai 56/100803 (1981), see Chem. Abst. 95: 221461q; EP0058483; and EP0074708.

Most preferably, the acid phosphate esters have the formula:

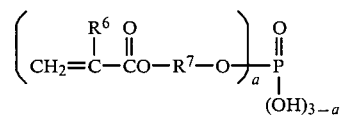

where $R^6$ is H or methyl, $R^7$ is a divalent organic residue having from 2–40 carbon atoms and a is 1 or 2. Suitably, $R^7$ is $C_2$–$C_{10}$ alkylene. Examples of commercially available phosphate ester compounds include mono(methacryloxyethyl)phosphate; bis(methacryloxyethyl)phosphate; mono(acryloxyethyl)phosphate; bis(acryloxyethyl)phosphate; mixed mono and bis(acryloxyhexyl)phosphate and mixed mono and bis(methacryloxyhexyl)phosphate.

Corresponding norbornene acid phosphate esters are acid phosphate esters as described above in which the (meth)acrylate group is replaced with a norbornene-5-carboxylate group:

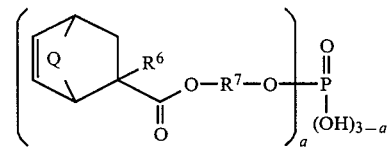

Such compounds can be prepared by reaction of POCl$_3$ with a 2-hydroxyalkylnorbornene carboxylate, followed by hydrolysis, or by Diels-Alder reaction of cyclopentadiene and a (meth)acrylic acid phosphate ester. Other norbornene phosphate monomers can be prepared by POCl$_3$ reaction with other norbornenyl functional alcohols such as norbornene methanol, followed by hydrolyis to the mono or bis 5-norbornene methylphosphate:

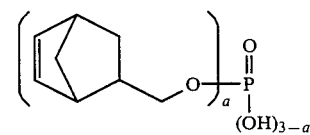

A second class of adhesion promoting additive comprises carboxylic acids selected from the the group consisting of maleic, acrylic, methacrylic, norbornene dicarboxylic and fumaric acids and half acid/esters or half acid/peresters of maleic, fumaric and norbornene dicarboxylic acids. Suitable peresters include mono-t-butylperoxy maleate (peroxymaleic acid) and mono-t-butylperoxy fumarate. Suitable half esters are hydrocarbyl and hydrocarbylether maleates and fumarates, particularly monoalkylmaleates and monoalkyleneoxyalkyl maleates.

The adhesion improving performance of these acidic compounds, particularly on zinc surfaces such as galvanized steel is surprising. Acrylic and methacrylic acids have been observed to reduce thermal resistance and actually lessen adhesion of anaerobic acrylic adhesives to zinc substrates. Although maleate double bonds will undergo thermally induced addition of thiol, the maleate double bond is significantly less susceptible to radical catalyzed thiol addition than allylic double bonds under ambient conditions. Norbornene dicarboxylic acid is not known to have been reported as an adhesion promoter in any system. At least one other unsaturated acid, 5-allylbarbituric acid, has been shown to provide some adhesion promotion on steel substrates but its performance on zinc substrates is much worse than controls employing no adhesion promoter.

A final class of compounds useful as thiolene adhesion promoters are norbornene, or acrylate, functional silyl compounds which also have two or three hydrolyzable groups bound to the silicon atom. Suitable hydrolyzable groups are known in the art and include alkoxy, acetoxy, and oxime groups. Acetoxy groups are preferred. Such compounds are useful for improving adhesion to glass and, again surprisingly, to zinc substrates. Examples of such compounds include 5-(triacetoxysilyl)norbornene and acryloxyethyltriacetoxysilane.

The adhesion promoter may be used either as a component of the composition, uniformly dissolved suspended in the mixture of thiol and ene resins or as a surface primer which difuses into the adhesive compositions at the adhesive/substrate interface. When directly mixed into the composition the adhesion promoter may be usefully employed at levels of between about 0.1% and 10%, preferably between about 0.5% and 5% and more preferably between about 1% and 3%, based on total composition weight. Perester adhesion promoters can optionally be used as both initiator and adhesion promoter in such directly mixed formulations, eliminating the need for a separate thermal initiator. When used as a surface primer the adhesion promoter is preferably dissolved in a neutral solvent.

The invention is illustrated by the following non-limiting examples:

EXAMPLE 1

PREPARATIVE EXAMPLE OF PREFERRED ENE RESIN

Sartomer 351 ™ (diacrylate ester of ethoxylated bisphenol A, 1 mole) was stirred at 40° C and freshly cracked cyclopentadiene (2.2 equivalents) was added at such a rate that the reaction temperature rose to ca. 75° C. The reaction mixture was maintained at 75° C. overnight. The reaction mixture was then stripped on a rotary evaporator. Analysis of the reaction mixture by HPLC showed the conversion to be complete. The product, ethoxylated bisphenol A-bis(norborn-2-ene-carboxylate) may be represented by the formula:

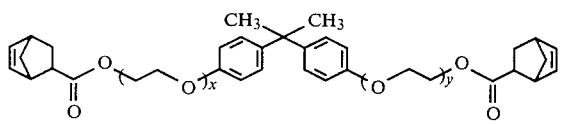

where x+y is an average 3.4

EXAMPLE 2

An adhesive comprising a base composition of ethoxylated bisphenol A-bis(norbornene-2-ene-5-carboxylate) 70%, pentaerythitol tetra-(3-mercaptopropionate) 28% and t-butylperoxy benzoate 2%, and a primer composition of 1% by weight PA-21, a commercial mixture of mono and bis acryloxyhexylphosphate in methyl ethyl ketone was prepared. The primer composition was applied to pairs of 1 inch×4 inch (2.54 cm×10.16 cm) test specimens and the solvent was allowed to evaporate. The base composition was then applied and the test specimens were then joined and the adhesive cured by placing the joined assembly in a 250° F. (121° C.) oven for 2 hrs. Controls using no primer were run simultaneously. Results on three test specimen materials at two different bond gaps are shown in table 1. The results in all tables are averages of three samples each.

TABLE I
ADHESION PROMOTERS FOR THIOLENE HEAT CURED FORMULATIONS

| Substrate | Adhesion Promoter | Gap | TSS(psi) |
|---|---|---|---|
| Steel | None | 0 | 2311 |
| Steel | PA-21 | 0 | 4478 |
| Steel | None | 10 mil | 1002 |
| Steel | PA-21 | 10 mil | 3279 |
| Galvanized | None | 0 | 505 |
| Galvanized | PA-21 | 0 | 2679 |
| Galvanized | None | 10 mil | 404 |
| Galvanized | PA-21 | 10 mil | 2278 |
| Copper | None | 0 | 1170 |
| Copper | PA-21 | 0 | 1381 |
| Copper | None | 10 mil | 787 |
| Copper | PA-21 | 10 mil | 972 |

EXAMPLE 3

A control adhesive was prepared using the base formulation of the previous example without a primer. A modified adhesive using 2% peroxymaleic acid (POMA) in place of the 2% t-butylperoxy benzoate in the control was also prepared. Steel and galvanized specimens were bonded and tested as in the previous example. The results shown in Table II demonstrate that peroxymaleic acid functions effectively as an adhesion prompter as well as an initiator.

TABLE II
PEROXYMALEIC ACID INITIATED HEAT CURED THIOLENE FORMULATIONS

| Substrate | Adhesion Promoter | Gap | TSS(psi) |
|---|---|---|---|
| Steel | None | 0 | 2836 |
| Steel | POMA | 0 | 3149 |
| Steel | None | 10 mil | 1334 |
| Steel | POMA | 10 mil | 3101 |
| Galvanized | None | 0 | 684 |
| Galvanized | POMA | 0 | 1578 |
| Galvanized | None | 10 mil | 440 |
| Galvanized | POMA | 10 mil | 2811 |

EXAMPLE 4

Adhesives were prepared as in Example 2 except that the primer used was a 1% solution of the compounds listed in Table III. The adhesives were applied to galvanized steel test specimens, cured, and tested as in Examples 2 and 3. The results given in Table III demonstrate that 5-allylbarbituric acid, an unsaturated carboxylic acid outside the scope of this invention reduced adhesion and 3-norbornenyl propenoic acid, another unsaturated acid outside the scope of the invention, provided relatively little adhesion improvement whereas the remaining compounds, all within the scope of the invention provided significant improvement.

TABLE III t-Butylperoxy Benzoate Heat Cured Norbornenes
Thiol Formulation Tensile Shear Strength
Adhesion Promoter Primed As Received
Galvanized Steel Lap Shears

| Adhesion Promoter | TSS (lb/in$^2$) |
|---|---|
| Control (None) | 1238 |
| Maleic Acid | 2083 |
| 2-(triacetoxysilyl) Norborn-5-ene | 1702 |
| PA-21 | 2438 |
| 3-Norbornenylpropenoic Acid | 1352 |
| 5-Allylbarbituric Acid | 858 |
| Acrylic Acid | 1862 |
| Norbornene 2,3 dicarboxylic Acid | 1788 |
| t-butylperoxy Maleate | 2017 |

EXAMPLE 5

Example 4 was repeated except that steel lap shear coupons were used as the test specimens. The results in Table IV are from two different test series. On this substrate the norbornenylpropenoic acid reduced adhesion whereas all other materials improved adhesion in varying degrees.

TABLE IV t-Butyl Perbenzoate Heat Cured
Norbornene-Thiol Formulation
Tensile Shear Strengths
Adhesion Promoter Primed
As Received Steel Laps

| Adhesion Promoter | TSS (lbs/in$^2$) | Test Series |
|---|---|---|
| None (Control) | 3081 | A |
| Maleic Acid | 3553 | A |
| None (Control) | 3249 | B |
| Maleic Acid | 3339 | B |
| Control | 3081 | A |
| PA-21 | 4042 | A |
| Control | 3249 | B |
| PA-21 | 3661 | B |
| Control | 3081 | A |
| 5-(triacetoxysilyl)-Norbornene | 3166 | A |
| Control | 3249 | B |
| 5-(triacetoxysilyl)-Norbornene | 3675 | B |
| Control | 3081 | A |
| 5-Allylbarbituric Acid | 3492 | A |
| Control | 3081 | A |
| 3-Norbornene propenoic Acid | 1825 | A |
| Control | 3081 | A |
| t-butylperoxy Maleate half ester | 3782 | A |

What is claimed is:

1. In a thiolene composition curable free radically under thermal conditions, the composition comprising a base formulation including a polythiol resin and a polyene resin, the improvement wherein the composition further includes an adhesion promoter compound selected from the group consisting of norbornene acid phosphate esters; ;norbornene functional silanes having two or three hydrolyzable groups bound to the silicon atom thereof; maleic, nobornene dicarboxylic and fumaric acids; half peresters of maleic, fumaric and norbornene dicarboxylic acids; and half esters of maleic, fumaric and norbornene dicarboxylic acids, in an amount effective to promote adhesion of the cured composition relative to the base composition without said adhesion promoter compound.

2. A composition as in claim 1 wherein the said adhesion promoter comprises a surface primer which has diffused into said thiolene composition after said primer and thiolene compositions have been successively applied to a substrate upon which the substrate is to be cured.

3. A composition as in claim 1 wherein the said adhesion promoter is a component uniformly mixed into said thiolene composition prior to application thereof to a substrate on which the composition is to be cured.

4. A composition as in claim 1 wherein the adhesion promoter compound is selected from the group consisting of:
a) norbornene acid phosphate esters;
b) maleic, norbornene dicarboxylic and fumaric acids and half esters of maleic, fumaric and norbornene dicarboxylic acids; and
c) norbornene functional silanes having two or three hydrolyzable groups bound to the silicon atom thereof, and the composition further includes an effective amount of a free radical initiator selected from the group consisting of peroxy compounds, azonitrile compounds and benzopinacol.

5. A composition as in claim 1 wherein the adhesion promoter is selected from the group consisting of maleic acid, fumaric acid, and norbornene dicarboxylic acid and half esters and half peresters of said acids.

6. A composition as in claim 1 wherein the adhesion promoter is a norbornene acid phosphate ester.

7. A composition as in claim 1 wherein the adhesion promoter is a norbornene functional silane.

8. A composition as in claim 7 wherein the adhesion promoter is 5-(triacetoxysilyl)norbornene.

9. A thiolene composition curable free radically under thermal conditions comprising (a) a polythiol resin, (b) a polyene resin having the formula:

where A is an n-valent organic or polyorganosiloxane residue, n is an integer of at least 2, and X is a group selected from the class consisting of:

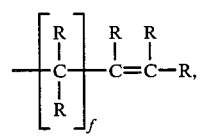

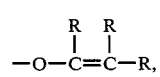

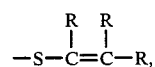

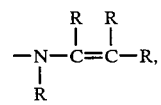

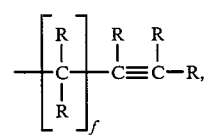

-continued

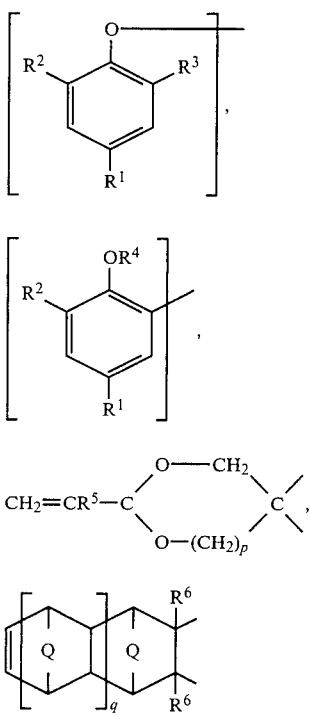

f is an integer from 1 to 9; R is a radical selected from the group consisting of hydrogen, fluorine, chlorine, furyl, thienyl, pyridyl, phenyl and substituted phenyl, benzyl and substituted benzyl, alkyl and substituted alkyl, alkoxy and substituted alkoxy, and cycloalkyl and substituted cycloalkyl, the substituents on the substituted members being selected from the group consisting of nitro, chloro, fluoro, acetoxy, acetamide, phenyl, benzyl, alkyl, alkoxy and cycloalkyl alkyl and alkoxy groups having from one to nine carbon atoms and cycloalkyl groups having from three to eight carbon atoms, at least one of $R^1$, $R^2$, and $R^3$ is a member of the group consisting of vinyl, 1-propenyl and isopropenyl and the remaining $R^1$, $R^2$, and $R^3$ groups are selected from H, lower alkyl and alkoxy, $R^4$ is alkyl, $R^5$ is H or alkyl, p is 0 or 1, $R^6$ is H or alkyl O is $CR^6{}_2$, O, S, $NR^6$ or $SO_2$ and q is an integer from 0 to 10, and (c) an effective amount of an adhesion promoter compound wherein the adhesion promoter compound is a maleic acid monoperester.

10. A composition as in claim 6 wherein the adhesion promoter is selected from mono and bis 5-norbornenecarboxyethylphosphate; mono and bis 5-norbornenecarboxyhexylphosphate; and 5-norbornenemethylphosphate.

11. A composition as in claim 1 wherein the polyene includes a plurality of norbornene groups.

12. In a thiolene composition curable free radically under thermal conditions, the composition comprising a base formulation including a polythiol resin and a polyene resin, the improvement wherein the composition further includes an adhesion promoter compound selected from the group consisting of maleic, norbornene dicarboxylic and fumaric acids, half peresters of maleic, fumaric and norbornene dicarboxylic acids, and hydrocarbyl or hydrocarbylether half esters of maleic, fumaric and norbornene dicarboxylic acids in an amount effective to promote adhesion of the cured composition relative to the base composition without said adhesion promoter compound.

13. A composition as in claim 1 wherein the adhesion promoter is present in an amount of between 0.1% and 10%.

14. A composition as in claim 1 wherein the adhesion promoter is present in an amount of between 0.5% and 5%.

15. A composition as in claim 11 wherein the polyene has the formula:

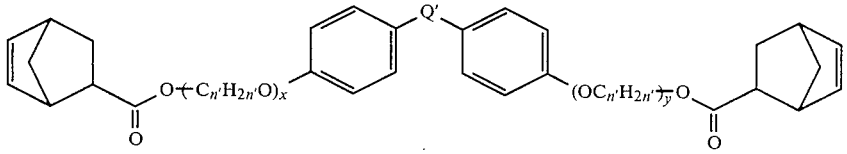

where Q' is $CR^5$, O, S, $NR^5$ or $SO_2$, $R^5$ is H or alkyl, n' is 1-6, and x and y are integers of one or more.

16. A composition as in claim 11 wherein the polythiol is an ester of a polyol and an α or β-mercaptocarboxylic acid.

* * * * *